Aug. 23, 1949.  A. J. WAHL ET AL  2,480,062
METHOD AND APPARATUS FOR MAKING POTTERYWARE
Filed March 26, 1946  8 Sheets-Sheet 1
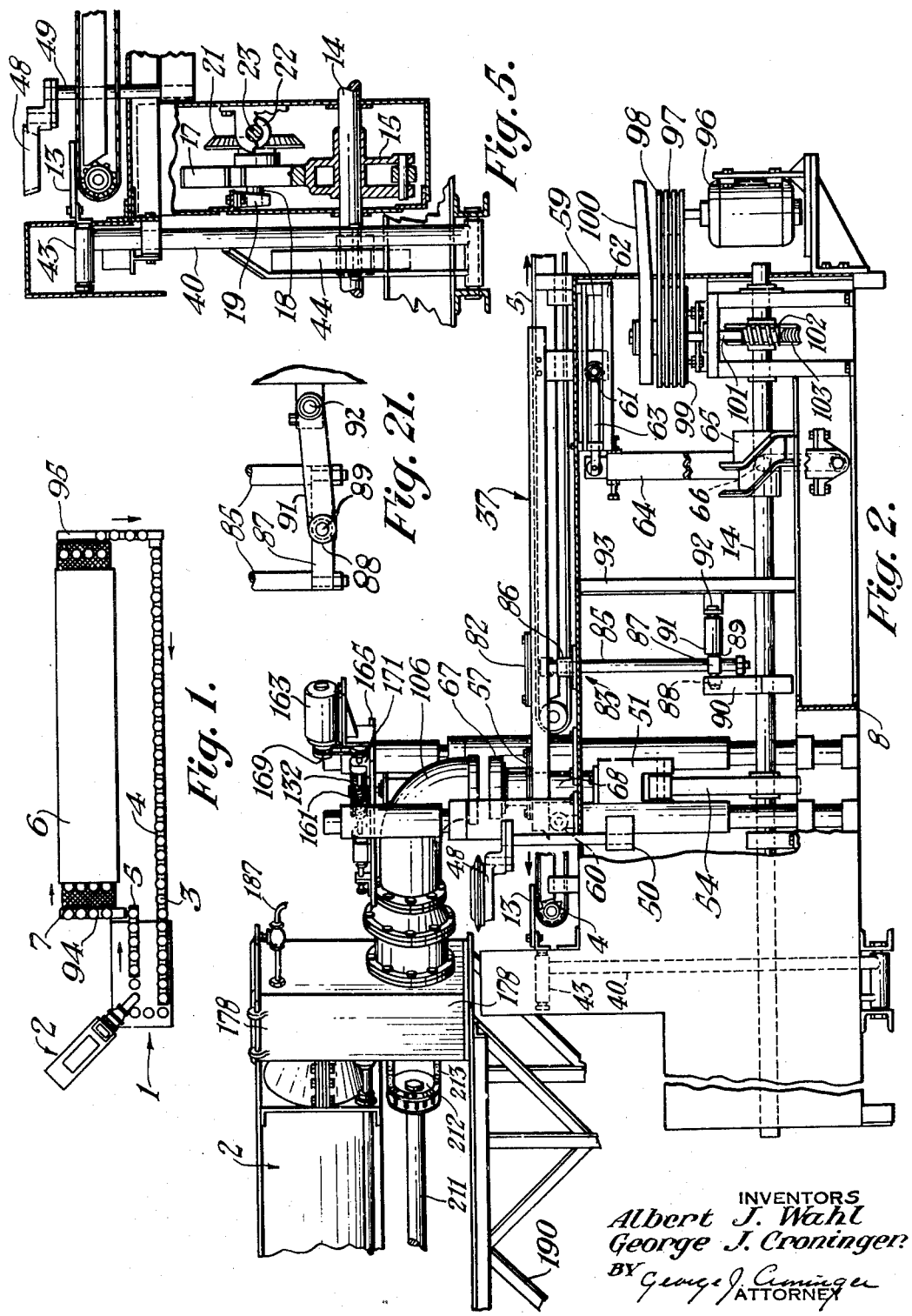
INVENTORS
Albert J. Wahl
George J. Croninger
BY George J. Croninger
ATTORNEY Aug. 23, 1949.  A. J. WAHL ET AL  2,480,062
METHOD AND APPARATUS FOR MAKING POTTERYWARE
Filed March 26, 1946  8 Sheets-Sheet 2

INVENTORS
*Albert J. Wahl*
*George J. Croninger*
BY *George J. Croninger*
ATTORNEY Aug. 23, 1949.　　　A. J. WAHL ET AL　　　2,480,062
METHOD AND APPARATUS FOR MAKING POTTERYWARE
Filed March 26, 1946　　　　　　　　　　　　8 Sheets-Sheet 3

INVENTOR
Albert J. Wahl
George J. Croninger
BY George J. Croninger
ATTORNEY

Aug. 23, 1949.  A. J. WAHL ET AL  2,480,062
METHOD AND APPARATUS FOR MAKING POTTERYWARE
Filed March 26, 1946  8 Sheets-Sheet 4

INVENTORS
Albert J. Wahl
George J. Croninger
BY George J. Croninger
ATTORNEY

Aug. 23, 1949.  A. J. WAHL ET AL  2,480,062
METHOD AND APPARATUS FOR MAKING POTTERYWARE
Filed March 26, 1946  8 Sheets-Sheet 5

INVENTORS
Albert J. Wahl
George J. Croninger
BY George J. Croninger
ATTORNEY

Aug. 23, 1949.  A. J. WAHL ET AL  2,480,062
METHOD AND APPARATUS FOR MAKING POTTERYWARE
Filed March 26, 1946  8 Sheets-Sheet 6
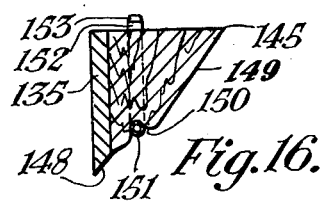
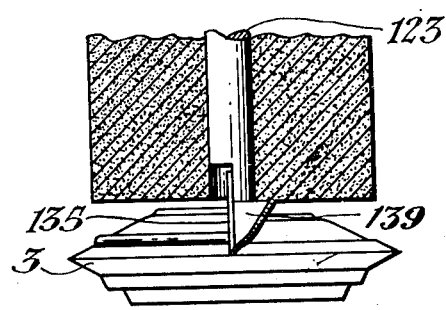
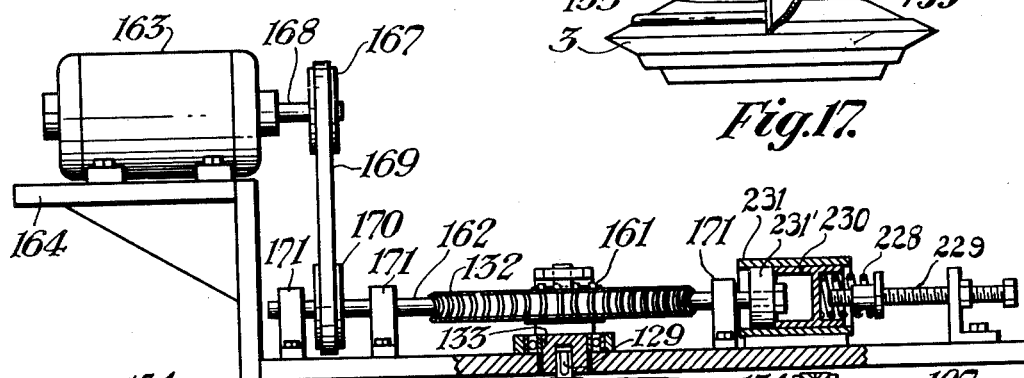
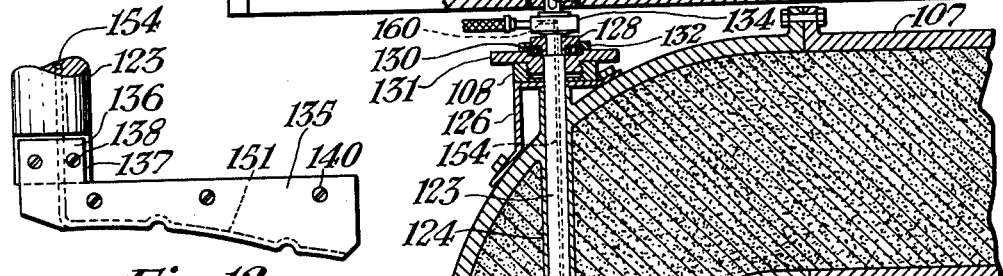
INVENTORS
Albert J. Wahl
George J. Croninger
BY George J. Croninger
ATTORNEY Aug. 23, 1949.  A. J. WAHL ET AL  2,480,062
METHOD AND APPARATUS FOR MAKING POTTERYWARE
Filed March 26, 1946  8 Sheets-Sheet 7

INVENTORS
Albert J. Wahl
George J. Croninger.
BY George J. Croninger
ATTORNEY

Patented Aug. 23, 1949

2,480,062

UNITED STATES PATENT OFFICE 2,480,062

METHOD AND APPARATUS FOR MAKING POTTERYWARE

Albert J. Wahl, Pleasant Hills, and George J. Croninger, Swissvale, Pa., assignors to Miller Pottery Engineering Company, Swissvale, Pa., a corporation of Pennsylvania Application March 26, 1946, Serial No. 657,204

11 Claims. (Cl. 25—22)

This invention relates to a method of and apparatus for making potteryware. It has to do particularly with the making of jiggered dinnerware and the like in continuous, automatic fashion.

One object of this invention is to provide a line production system for the forming and drying of jiggered dinnerware wherein the clay from which the ware is made is fed to and jiggered on the mold at a single station, and wherein, the molds are automatically carried to the jiggering station for feeding and fabricating operations and are automatically removed therefrom and carried away for drying operations.

Another object of this invention is to reduce the number of steps or operations heretofore practiced in making ware by automatic process, and to simplify the procedure and mechanical equipment, and generally to increase the quantity of ware made from a given tonnage of clay and improve the quality of the production.

Another object of this invention is to provide for automatic jiggering machinery having coordinated clay supplying, ware fabricating, mold handling and transporting means capable of mechanically performing the operations necessary for the automatic production of ware of the class described without manual intervention.

Another object is to provide improved automatic jiggering machinery having improved clay feeding, ware forming, and mold handling facilities. Another object is to provide an automatic jiggering machine having improved jigger tool supporting and operating means. Another object is to provide an automatic jiggering machine having improved ware lubricating facilities.

Other objects and advantageous features will be noted in the following detailed description and drawings wherein:

Figure 1 is a plan view which illustrates diagrammatically an apparatus for forming and drying potteryware incorporating the improvements hereof.

Figure 2 is a side elevation of the automatic jiggering machine hereof with some of the parts broken away and with the rear or drive end of the pug mill omitted.

Figure 5 is a view partly in section showing a portion of the mold conveyor drive.

Figure 10 is an elevation, partly in section of the jiggering apparatus.

Figure 12 is a front view of a jiggering tool.

Figure 13 is a bottom of the tool of Figure 12.

Figure 14 is an end view of the tool of Figure 12.

Figures 15 and 16 are end views showing jigger tool modifications.

Figure 17 is a detail view, partly in section, illustrating the jigger tool of Figure 12 in action.

Figure 21 is a fragmentary detail showing part of one of the mold lifters.

With reference to the drawings, 1, Figure 1, designates the automatic jiggering machine and 2, a co-ordinated pug mill arranged to supply clay to the jiggering station. Molds 3 are carried by a conveyor 4 to the jiggering machine for filling and, when filled are transported by conveyor 5 to a dryer 6 where they are transferred to the dryer conveyor 7 to be carried through the drying chamber to dry the ware. The system is continuous in operation and the molds may be transferred into and removed from the dryer either automatically or by hand.

Figure 3:
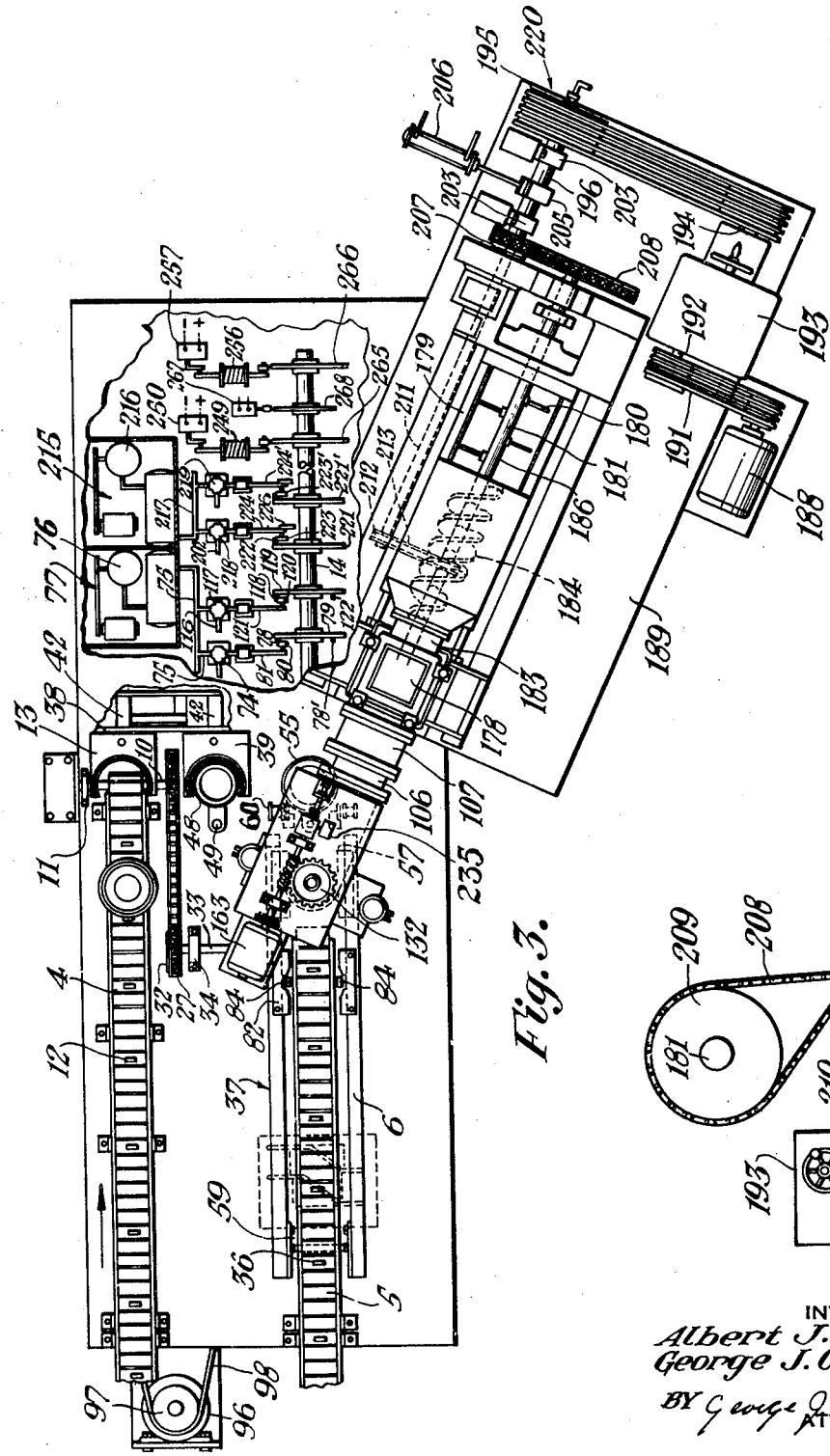
Figure 3 is a plan view of the jiggering machine of Figure 2, the pug mill being shown in full.
Figure 6:
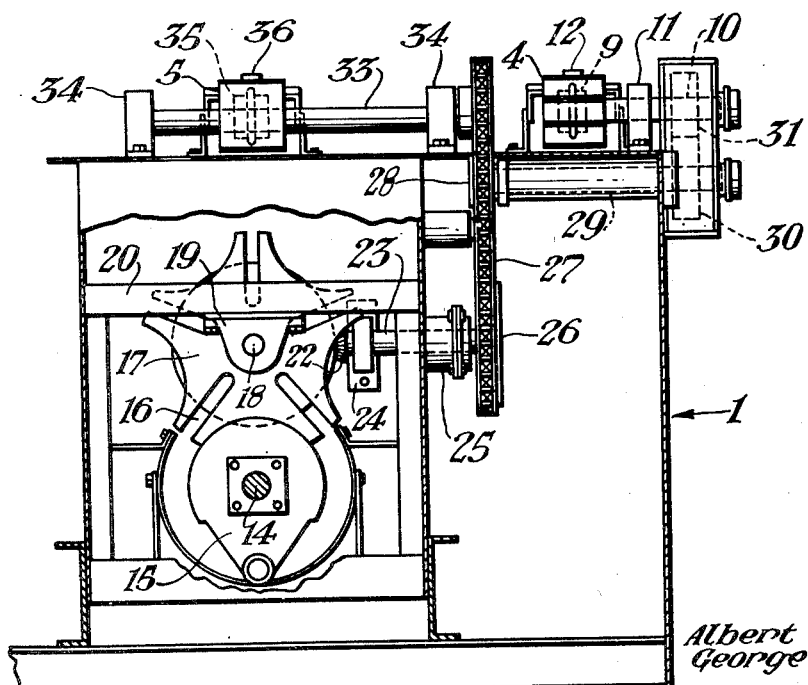
Figure 6 is a vertical section view illustrating primarily the Geneva drive for the mold conveyors.

The automatic jiggering machine, Figures 2 and 3, has a frame 8 of fabricated metal construction. One end of mold conveyor 4 is supported on top of said frame. Said conveyor preferably comprises a flat top, metal chain traveling over sprockets, one of which is shown at 9, Figure 6, mounted on shaft 10 supported in bearing 11. Said chain is provided with spaced lugs 12, Figure 3, for the purpose of locating the molds and also for pushing them into the transfer fork 13 which is positioned at the front of conveyor 4 with the open end above and facing the upper level of the conveyor so the molds may be moved thereinto.

Conveyor 4 is intermittently moved in the direction of the arrow, Figure 2, by means of a Geneva drive operated by the main cam shaft 14 of the machine. Said drive comprises, a Geneva cam 15, Figure 6, fixed on cam shaft 14, which engages successively in the slots 16 of Geneva gear 17 secured to shaft 18 supported by bearing 19 from frame lateral 20. A gear 21 is secured to shaft 18, Figure 5, for driving pinion gear 22 on shaft 23 supported by bearings 24 and 25, Figure 6. On the opposite end of said shaft a sprocket 26 is fixed for driving sprocket chain 27. Sprocket chain 27 is connected to sprocket 28 on shaft 29 extending across and below conveyor 4. On the opposite end of shaft 29, a gear 30 is fixed which drives gear 31 secured to shaft 10 on which drive sprocket 9 is mounted.

Chain 27 is also connected to sprocket 32, Figure 3, on shaft 33, supported by bearings 34 mounted on top of the machine frame. Shaft 33 has a sprocket 35 secured thereto for driving conveyor 5 in the opposite direction to conveyor 4. Conveyor 5 is the same construction as conveyor 4 and is provided with spaced chain lugs 36. It carries molds with filled ware from the jiggering machine to the dryer and it is driven intermittently and at the same time as conveyor 4.

Transfer fork 13, Figure 3, forms part of a mold transferring apparatus for carrying molds to a reciprocable mold carrier 37 that transports molds through the fabricating zone to a point where they may be unloaded onto conveyor 5 in a manner to be later described. Said mold transferring apparatus comprises a bar or holder 38 to which fork 13 and a similar fork 39, Figure 3, are secured in predetermined spaced relation. To support the holder 38 and mold forks, a pair of vertical posts 40, pivoted at 41 on a lower cross member of the machine frame are provided. Each post has a tubular bearing 42 at the top thereof in which a connecting pin 43 is inserted, Figure 7, to secure holder 38 thereto. The posts are intermittently moved back and forth by a cam 44 on shaft 14 and spring 45. They are guided in their movement by a roller 46 on each post running inside of a stationary guide bar 47 supported by the machine frame.

Figure 8:
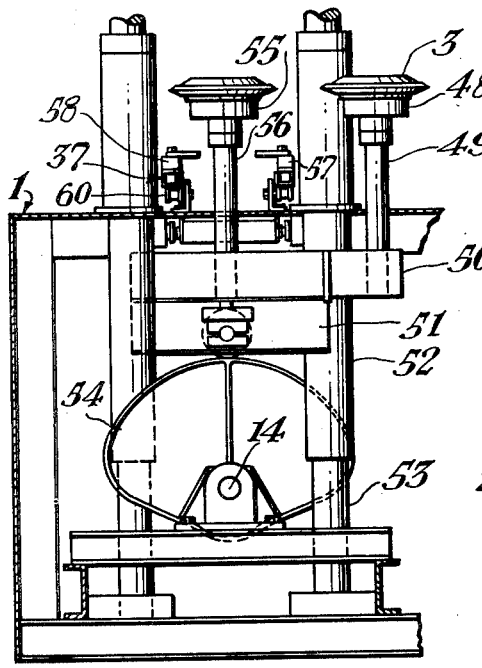
Figure 8 is a sectional view showing mold handling and lifting apparatus at and adjacent the jiggering station.
Figure 7:
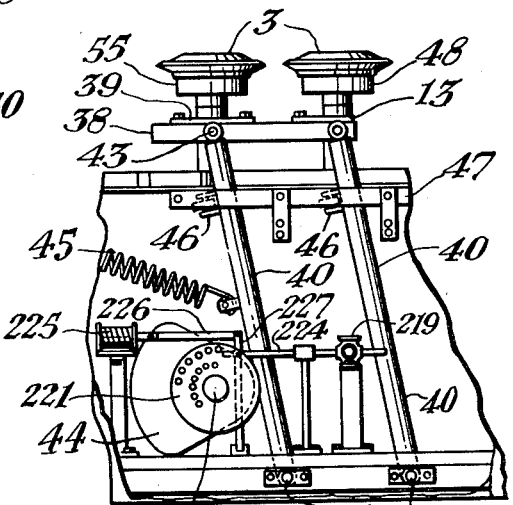
Figure 7 is an end view of the jiggering machine showing the timer and some of the mold transferring apparatus.

After a mold enters fork 13, Figure 3, the fork is shifted to the left, Figure 7, to carry the mold to a position directly over an offset mold lifter 48 mounted on a post 49, Figures 5 and 8, supported by an extension 50 of crosshead 51. Said lifter 48 is in the form of a hollow ring, smaller in diameter than the inside diameter of fork 13 and is adapted to pass upwardly therethrough to lift a mold therefrom. Said crosshead 51 is formed with tubular slides 52 sleeved on stationary, vertical posts 53 supported by the machine frame. The crosshead is raised and lowered by a cam 54 on cam shaft 14.

When the mold lifter 48 is in raised position, fork 13 is moved to the right, Figure 8, to mold receiving position and this movement positions fork 39 below the elevated lifter. Then, when lifter 48 is lowered, the mold is deposited on fork 39 and the lifter moves to a position therebelow so as not to interfere with the movement of the fork 39 which moves to the left, Figure 8, to carry the mold to a position directly over another mold lifter 55 spaced from mold lifter 48 and supported on an offset post 56 carried by crosshead 51.

While the mold is thus raised above fork 39, the transfer shifts to the right to return fork 39 to the intermediate position and the end seat 57 of a reciprocable intermittently movable, mold indexing means 37, Figure 3, for carrying molds from station to station, operating at right angles to fork 39 slides into position therebelow. Said mold carrier 37 comprises a pair of spaced, parallel bars joined together at the rear by a U-shaped cross piece 59, Figure 2. Said bars are supported upon rollers 60 mounted on the machine frame Figures 2 and 9.

The U-shaped cross piece supports the rear end of the mold indexing means on rollers 61 resting on horizontal rails 62, Figure 2. Pivotally connected to the cross piece is a pull bar 63 pivotally connected to a lever 64 formed as an inverted Y and straddling the main cam shaft 14. On this shaft is secured a track cam 65 which engages roller 66 attached to one leg of the Y and as the cam revolves, the transfer is shifted back and forth in a horizontal plane in timed relation with the movement of conveyors 4 and 5 and mold transfer forks 13 and 39.

Figure 10A:
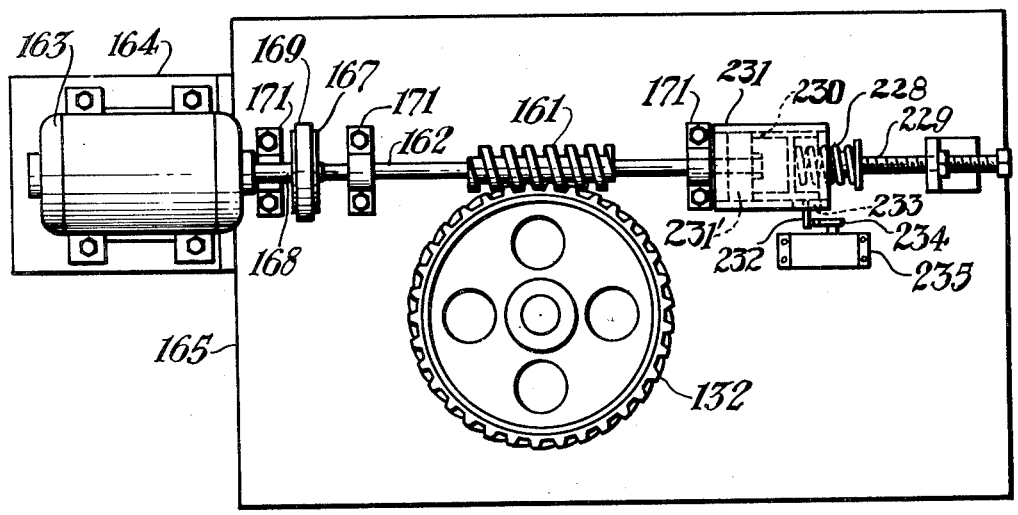
Figure 10A is a plan view of the apparatus of Figure 10.
Figures 9, 19:
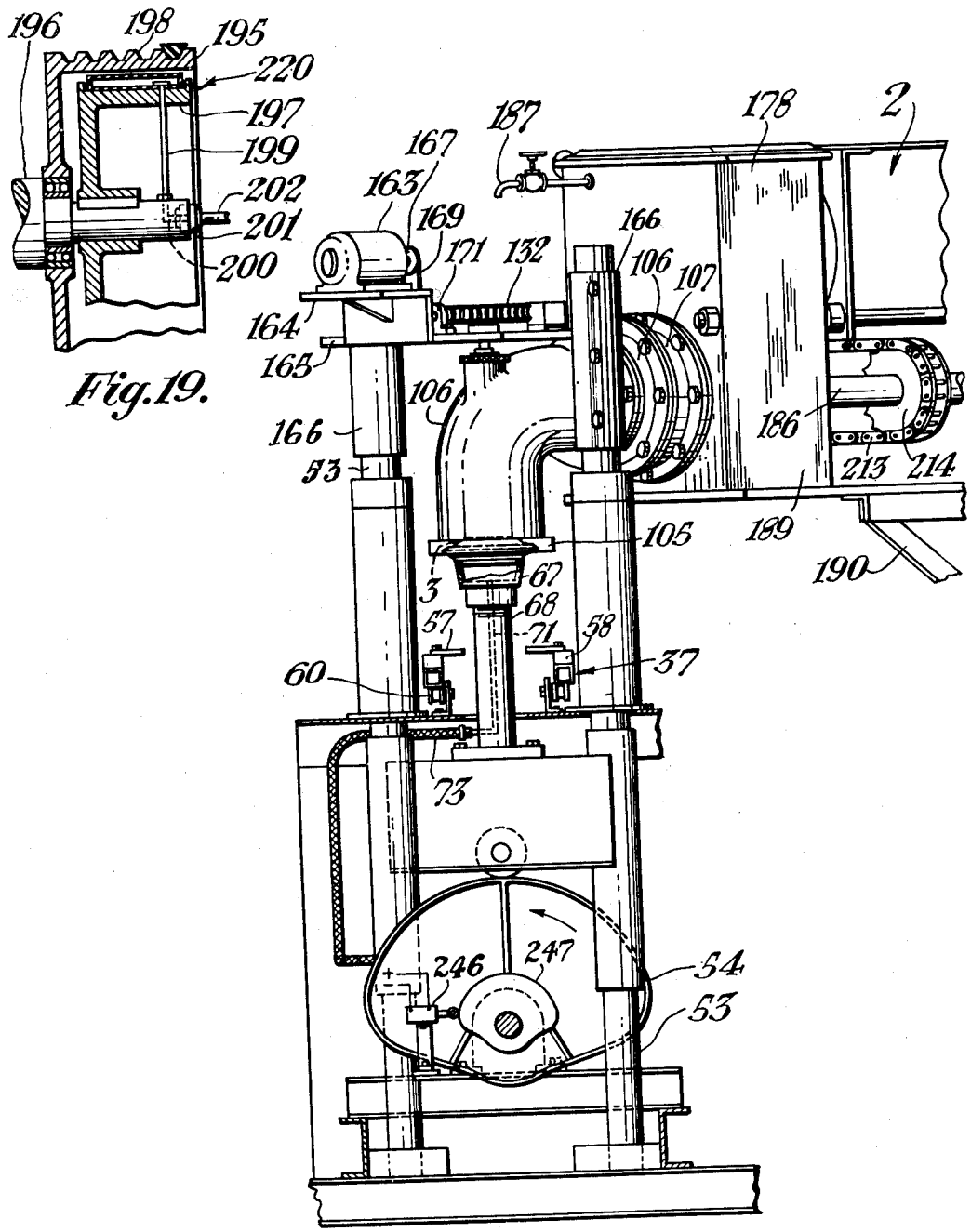
Figure 9 is a vertical section taken substantially upon line 9—9 of Figure 3 showing the jigger station and discharge end of the pug mill.
Figure 19 is a fragmentary detail in section of the pug mill drive clutch.

After a mold has been deposited in the end seat 57 of mold transfer 37, at the transfer station, transfer 37 is shifted to the right, Figure 2, to carry the mold to a jiggering station where the mold stops directly over hollow mold chuck 67, Figures 9 and 10, mounted on a post 68 carried by crosshead 51. Said chuck is preferably screwed on post 68 and is adjustable for height relative thereto and is provided with a resilient cushion seat for the mold in the form of a rubber ring 69 cemented or otherwise secured to the circular upper rim of the chuck. The chuck is hollow and sufficiently deep to accommodate the mold tang. A pipe 71 is threaded into hole 72 in the base of the chuck and the other end of the pipe is connected to a flexible hose 73 attached to the inlet side of a valve 74, Figure 3, whose outlet is connected by pipe 75 to the inlet of a tank 76 forming a part of a vacuum pump assembly 77. Just before the mold is lifted out of seat 57, a pin 78 on timer disc 79 mounted on cam shaft 14, strikes roller 80 on valve rod 81 causing the rod to be moved forward to operate valve 74 and connect hose line 73 with equalizing tank 76. When the mold is lifted by chuck 67 up to the jiggering position, the underside of the mold brim is sealed against the rubber ring 69 and the interior of the chuck 67 is vacuumized thus serving to grip the mold to the chuck and prevent its displacement during the fabricating operation. Vacuumizing the mold, which is made of plaster and is porous, also tends to help evacuate air from the forming chamber (to be later described) into which the forming surface of the mold is inserted. Pin 78' moves roller back to close valve 74.

At the end of the fabricating operation, the filled mold is lowered by chuck 67 and deposited in seat 82 of mold indexing means 37. During the fabricating operation, transfer 58 is shifted to the left, Figure 2, to locate seat 82 below the elevated chuck. When the mold is deposited in said seat, the chuck drops below the level of the transfer so as not to interfere with the next movement of the conveyor which shifts to the right, Figure 2, to carry the mold in seat 82 to a transfer station where the mold stops directly over a mold lifter 83 formed with a pair of lifting members 84, arranged one on each side of the loading end of conveyor 5, between the transfer side bars and the conveyor, Figures 2 and 3. Each member is mounted on a rod 85 which slides in a vertical sleeve 86 attached to the machine frame.

The rods are connected across their lower ends by a cross bar 87 on which a cam roller 88 is mounted, on a bearing pin 89, Figures 2 and 21. Cam 90 on main cam shaft 14 raises and lowers the lifter through engagement with said cam roller 88.

Rods 85 are stabilized by a lever 91, pivotally connected to bearing pin 89 and to a bracket secured to another bearing pin 92 secured to machine frame member 93, Figures 2 and 21. Thus, when the mold is spotted over lifting members 84, they are raised by cam 90 to lift the mold out of the seat 57. Then, after transfer 58 again shifts to the left, Figure 2, the mold is lowered upon the upper run of halted conveyor 5 between two of the chain lugs 36.

During the following cycles of the machine, the mold is carried to the right on conveyor 5, Figure 1, to a transfer point adjacent dryer 6 where it is placed manually or mechanically on a belt conveyor 94, Figure 1, running at right angles to and in front of the loading end of the dryer conveyor 7. Here the molds may be transferred by hand or mechanically to dryer conveyor 7 to be carried through the dryer to a discharge station at the opposite end of the dryer. During passage through the dryer, which may be equipped to provide any suitable drying medium such as hot air or infra red heat, the freshly formed, plastic ware is dried and caused to release from the mold. At the unloading station, the molds are placed, either manually or mechanically on a conveyor 95 operating at right angles to conveyor 7 to be carried to return conveyor 4 to which they may be transferred either by hand or mechanically and during the return trip to the jiggering machine, the molds are stripped of dried ware at some intermediate point.

It will be noted that the molds are cycled and recycled in endless fashion through the fabricating machine and the several transfer points and dryer. This may be a fully automatic cycle or one in which the molds are transferred between some of the conveyors by hand. In either event, the molds are moved in an endless path in repeated cycles and are automatically handled and manipulated in the fabricating zone.

The main cam shaft 14 of the jiggering machine is driven by motor 96. A pulley 97 is mounted on the motor shaft for driving V-belts 98 and pulley 99 which forms the drive element of a friction clutch controlled by lever 100. The driven element of the clutch is connected to worm shaft 101 which has a worm 102 thereon for driving worm wheel 103 fixed on shaft 14.

When the mold is lifted up to the fabricating tool, Figure 10, the verge of the mold engages a resilient sealing ring 104 seated in a groove in a ring 105 screwed on the lower end of a conduit or tube in the form of a curved pipe 106 whose inlet end is bolted to the nozzle or outlet 107 of a pug mill 2, Figure 9. The mold thus seals the lower or outlet end of the pipe and the molding surface, which enters the pipe, forms together with the leading end of the column of clay 109 thereabove, a chamber 110 in which the jigger tool 111 revolves. To vacuumize chamber 110, Figure 10, a slot 112 is made in the lower end of pipe 106 and connected by an external manifold 113, welded or otherwise secured to the pipe, to a clay trap 114 having clean out plugs 115 in each end. A vacuum line 116 is screwed into the trap at a level above the manifold inlet, and this pipe is connected to the outlet of a valve 117, Figure 3, whose inlet is connected to vacuum pipe 75. At or about the time the mold is sealed against the open end of pipe 106, one of the pins 118 on disc 119 fixed on camshaft 14, engages roller 120 on valve operating rod 121. This causes valve 117 to be turned to open position thereby connecting chamber 110 to the source of vacuum. The other pin 122 on disc 119 is positioned so as to strike roller 120 and move the rod 121 to valve closing position just prior to the time crosshead 51 is lowered by cam 54.

Jigger tool 111 is detachably secured to the lower end of a rotatable spindle 123 concentric with the vertical axis of pipe 106 at the outlet, which revolves in a tubular sleeve 124 supported at the lower end by a spider 125 welded or otherwise secured to the inside wall of pipe 106 above the outlet. The legs of this spider are preferably of rounded section so as not to impede the flow of clay and are also preferably of small diameter. The lower end of sleeve 124 may be sealed relative to shaft 123 to prevent entrance of clay.

A hole is bored in pipe 106 in vertical alignment with the center of the outlet therebelow and sleeve 124 and shaft 123 extend through this hole. Sleeve 124 is sealed with relation to the pipe to prevent the escape of clay and the upper end of the sleeve is welded or otherwise secured to a bracket 126 bolted to the pipe 106.

Shaft 123 may be axially adjusted to thereby raise or lower the tool 111 relative to the molding surface of the mold when in the fabricating position. To accomplish this, a collar 128 is pinned on the reduced upper end 129 of shaft 123 just above bearing 130. The bearing is held in a seat in the top of adjusting nut 131 by a retainer ring 132 and said adjusting nut is screwed into a stationary, threaded sleeve 108 fixed to bracket 126. Shaft 123 may be raised or lowered at any time by turning nut 131 in the proper direction. This adjustment controls the thickness of the ware and the adjustment may be made while the tool is operating or when tools are being exchanged.

To facilitate tool changes, shaft 123 is connected to drive gear 132 by a slip joint formed by squaring the reduced upper end 129 for insertion in a square hole in sleeve 133 fixed to the hub of gear 132. The tool 111 and shaft 123 may be pulled out of sleeve 124 through the open end of pipe 105 by first unloosening shaft seal 134 and then unscrewing adjusting nut 131. A replacement tool may be quickly mounted in position by inserting the tool shaft in sleeve 124 from below and assembling the adjusting nut and shaft seal thereon.

Jigger tool 111, comprises a bevel edged profile 135, Figures 12, 13 and 14, having an offset 136 provided with screw holes. In order to attach the tool to the shaft, a flat surface is milled diametrically across the end of the shaft as at 137 and this surface is drilled and tapped to receive screws 138. Backing block 139 is held to the tool by screws 140. 141 and 142 are the usual clay collecting grooves in the backing block which gather and compress clay into the foot and rim forming grooves 143 and 144 of the profile tool.

The wooden backing block 139, Figure 14, always leads the profile tool 135, during operation. The leading edge 145, Figure 16, of the block thus acts as a cutting edge to detach clay from the end of clay column 109, see Figure 17, and, if desired, the block may be provided with a thin metal block 146, Figure 15, to form a cutting member, said blade being riveted or otherwise secured in a notch in the top of the block as illustrated. The bottom surface 147, Figure 14, of the backing block is inclined rearwardly towards the tool 135 which has a beveled working surface 148 contiguous with the beveled edge of the block. The leading face of the backing block may be sloped rearwardly from the top edge 145 as shown at 149 in Figure 16 or, as shown at 149, Figure 14, the leading face may be straight up and down between the bottom surface 147 and the cutting edge 145.

In order to apply lubricant, for instance water, to the surface of the ware for the purpose of polishing it, the under-surface of the backing block has a groove 150 in which a perforated water pipe 151 is fastened. The inlet end 152 of the pipe, projects above the top of the backing block and is formed with a tapered seat 153 adapted to fit into a complemental seat at the lower end of a water passage 154 drilled parallel to the longitudinal axis of shaft 123.

Figure 11:
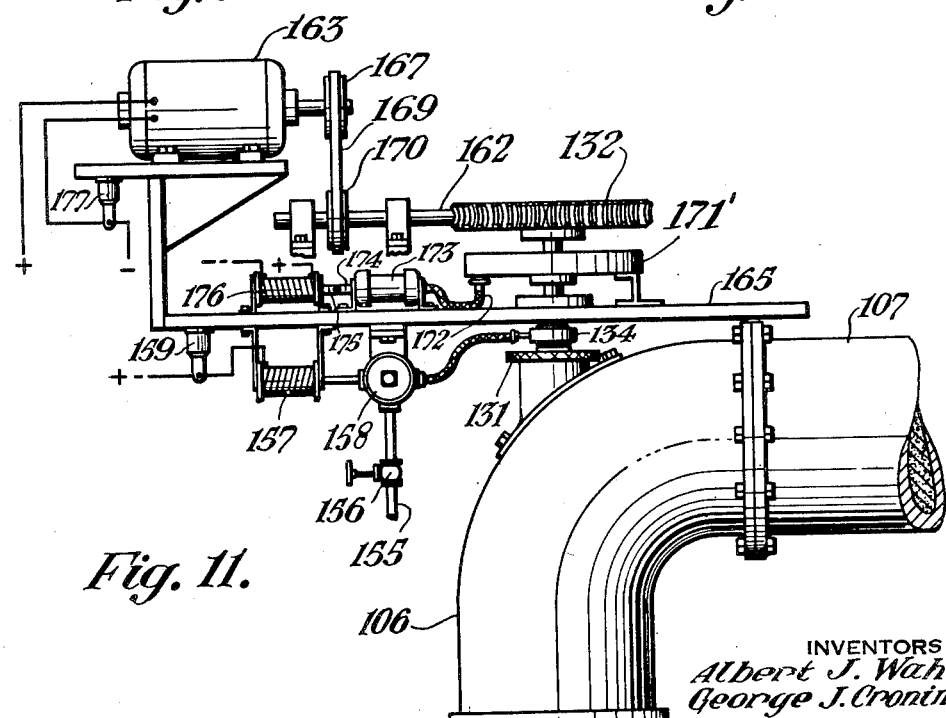
Figure 11 is a detail view of the jiggering station showing a modification in the mechanism.

Water is supplied to passage 154 from any suitable source such as a water main (not shown) to which one end of pipe 155, Figure 11, may be connected. This pipe has a manual shut-off valve 156 for turning off water whilst tool changes are being made and the flow to passage 154 is further controlled in a manner to be later described by a valve 158, solenoid 157 and delayed action switch 159. Pipe 155 is connected to a conventional shaft seal or gland 134 sleeved on shaft 123 and water is conducted therefrom to passage 154 by a radial bore 160, Figure 10, in shaft 123.

Shaft 123 is rotated by worm wheel 132 and a worm 161 fixed on shaft 162. Shaft 162 is driven by motor 163 mounted on a bracket extension 164 of platform 165, said platform being welded or otherwise secured to a pair of sleeves 166 clamped to the upper end of posts 53, Figure 9. A grooved pulley 167 fixed on the motor shaft 168 drives flexible V-belt 169 and pulley 170 fixed on shaft 162. This form of drive permits shaft 162 to move axially in bearings 171 to a limited extent for a purpose to be later described.

As shown in Figures 9 and 10, the drive just described is adapted for rotating the jigger tool 111 continuously at a constant speed and without interruption between and during successive cycles of the jiggering machine. If, however, it is desired to interrupt the rotation of the jigger tool during each jiggering machine cycle upon completion of the jiggering operation thereby providing for an intermittently rotated jigger tool, the apparatus may be modified as shown in Figure 11. In this arrangement, an hydraulic brake 171' may be incorporated in the drive just below the worm wheel. The internal brake shoe operating cylinder (not shown) of the brake is connected by flexible hose 172 to a master cylinder 173 mounted on platform 165. Piston rod 174 is connected to the armature 175 of solenoid 176 to be actuated thereby to apply the brake. Motor 163 is controlled by a delayed action switch 177. The operation of this intermittent drive will be hereinafter discussed in connection with the description of the operation of the machinery.

Figure 18:
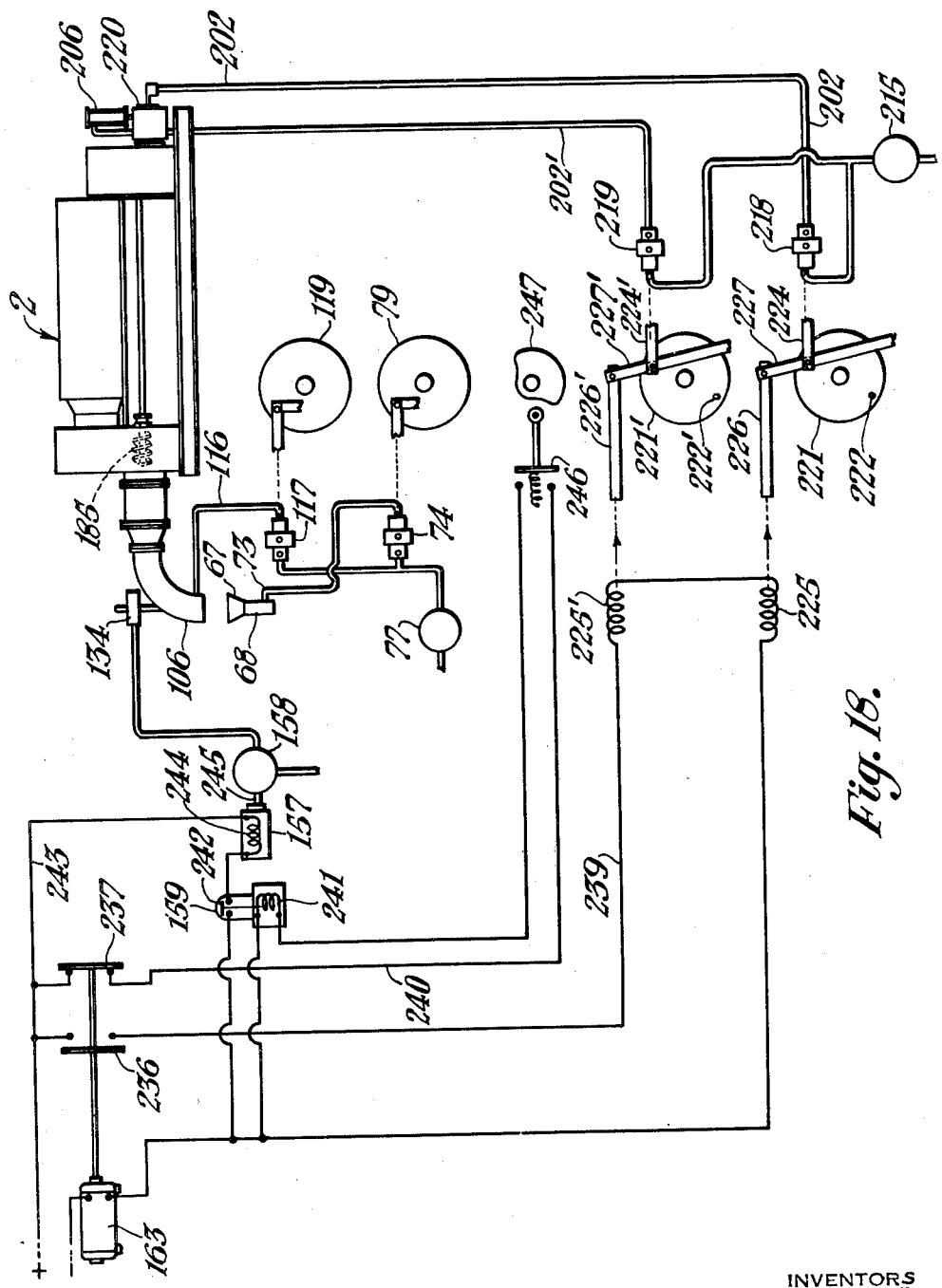
Figure 18 is a piping and wiring diagram showing the various electrical and fluid lines and control members.

Clay is preferably supplied to the mold by a vacuum pug mill, sometimes called a deairing pug mill because it is equipped with a deairing chamber 178, Figures 2 and 9, in which occluded air is removed from the clay by vacuum. Said pug mill comprises a barrel 179, Figure 3, having an opening through which filter pressed clay is dropped into the hollow interior. The pugging knives 180 on shaft 181 mascerate the clay and propel the same forward to the outlet which is connected by pipe 183 with the upper level of vacuum chamber 178. In machines of this character, the clay is forced through a shredder (not shown) by an auger 184, fixed on shaft 181 and the shredded clay falls to the lower level of the vacuum chamber where another auger 185, Figure 18, inside the vacuum chamber and in line with the inlet to pipe 107, extrudes the same as a solid column therefrom. Auger 185 is fixed on shaft 186 and is driven thereby. Vacuum may be applied to the interior of the vacuum chamber by any suitable means, as for instance, by connecting vacuum pipe 187 to vacuum tank 76, Figures 3 and 9.

Shafts 181 and 186 are driven by the following mechanism: motor 188, Figure 3, is an electric motor which is secured to a platform 189 that also supports the pug mill at the required level to feed the jiggering machine. The platform is elevated on frame work 190, Figure 2. Said motor is connected by a V-belt or other suitable drive 191 to the drive shaft 192, Figure 3, of an adjustable speed transmission 193 whose driven shaft 194 is connected by a V-belt or other suitable drive to a pulley 195, Figure 19, mounted to freely rotate on shaft 196 and forming the driving member of a releasable pneumatically operated clutch 220. The driven disc 197 of the clutch is fixed on shaft 196 and has a grooved rim in which is disposed an inflatable tube 198 connected by pipe 199 to a passage 200 in shaft 196. Attached to the end of the shaft is a rotary seal 201 of conventional construction adapted to transmit air under pressure from stationary pipe 202 to the air passage in rotatable shaft 196 thereby to inflate tube 198 and engage the clutch.

Figure 4:
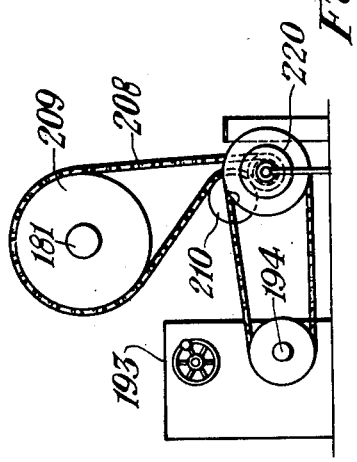
Figure 4 is an end view of the pug mill of Figure 3 showing the drive mechanism.

Shaft 196, Figures 3 and 4, is mounted in bearings 203 and between the bearings is a shaft brake 205 operated by an air motor 206. Sprocket 207 on shaft 196 is connected by chain 208, to a drive sprocket 209 on shaft 181 for operating the pug mill knives. Chain 208 is also connected to lower level sprocket 210 on shaft 211 which extends forwardly below the pug barrel and has a sprocket 212, Figures 2 and 9, fixed thereon, at the front end connected by chain 213 to sprocket 214 fixed on shaft 186. Air under pressure for operating the pneumatic clutch 220 and brake 205 is supplied by a compressor 215, Figure 3, having a pressure equalizing tank 216 and a main header 217 leading therefrom to the inlet side of valve 218 for controlling the operation of brake 205 and to the inlet side of valve 219 for controlling the operation of the pneumatic clutch. Valve 218 is automatically operated by means of a disc 221 fixed on shaft 14 having a pin 222 engageable with roller 223 on valve rod 224 to move it in one direction to open said valve. Valve rod 224 is moved in the opposite direction by a solenoid 225, Figure 7, whose armature is connected to a link 226 loosely connected to a connecting rod 227 pivoted on the machine frame and pivotally connected to rod 224. Valve 219 is automatically operated by similar means bearing the same reference numerals but with prime exponents.

We prefer to interrupt the feeding of clay to the profile tool when or after the requisite amount of material has been applied to the mold. One way of doing this is to interrupt the operation of the pug mill auger 185 by disengaging clutch 220 and applying brake 206. We have found that when this auger is stopped, the clay column in the outlet pipe 106 will retract slightly possibly due to the vacuum that exists in the degasifying chamber 178. This has the advantage of withdrawing the leading face of the clay column from the rotating jigger tool and prevents the possibility of bits and thin slivers being cut off and showered on the freshly formed surface of the ware as it is removed from forming chamber 110. Of course, the rotation of the jigger tool may also be stopped to avoid the production of stray cuttings and this may prove more advantageous in connection with non de-airing pug mills where reversal of movement of the column of clay is less apt to occur incident to shutting off of the power.

We propose to control the interruption of the operation of the pug mill in response to a predetermined increase in driving torque required to rotate jigger tool 111. When the depth of the material applied to the mold becomes equal to the clearance between the tool and the molding surface of the mold, an increase in resistance to rotation of the tool will occur. Since drive shaft 162 may move axially in its bearings but is held against such movement by the axial thrust of spring 228, Figure 10, whose back pressure may be pre set and adjusted by screw 229, the worm 161 will not move tangentially relative to gear 132. The thrust of spring 228 is applied to a double sleeve 230 slidable inside tubular housing 231. The open end of the sleeve opposite to the spring abuts against a friction roller 231' rotatably secured to the end of shaft 162. This roller acts as a guide and a bearing for the end of the shaft as well as a thrust receiving member. When the resistance to rotation of jigger tool 111 overcomes the thrust of spring 228, gear 161 will tend to screw shaft 162 in an axial direction thus forcing sleeve 230 to the right, Figure 10A. This will cause pin 232 which is fixed in the wall of sleeve 230 and projects through slot 233, to move rearwardly against switch lever 234 of double contact switch 235 thereby to close contact 236 and open contact 237, Figure 18, to respectively energize circuit 239 and de-energize circuit 240.

When circuit 239 is energized, push type solenoid 225' is also energized and this causes the solenoid plunger to thrust lever 226' to the right thereby opening valve 219 to cause brake 205 to be applied. At the same instant, push type solenoid 225 is energized and the plunger thereof pushes lever 226 to the right to thereby close valve 218 and release clutch 220. It will be understood a pull type solenoid may be substituted for solenoid 221 if the valves are turned in the same direction to close them or, if desired, valves having reverse settings may be employed.

The time at which the feeding of clay is interrupted during a machine cycle is a variable. The rate of flow of the clay through pipe 106 will have some influence on the length of time the pug mill is in operation each machine cycle. The rate of flow is influenced by the hardness or softness of the clay and these factors may vary with the filter cakes.

The time required for a machine cycle is however a constant for a given production. Thus, production speed for one class of ware may be greater or less than for another class of ware.

The pug mill is restarted at the same time during each successive machine cycle. This occurs when pin 222 on disc 221 strikes roller 223 and shifts lever 227 to the left, Figure 18, to open valve 218 and engage clutch 220. Simultaneously pin 222' on disc 221' engages roller 223' to shift lever 227' to the left and close valve 219 to release brake 206. Solenoids 225 and 225' are of course, de-energized when the pug mill operation is interrupted thus relaxing the clay pressure from above on tool 111. Shaft 162 thereupon returns to normal position thus releasing the control lever for switch 235 and de-energizing circuit 239.

We desire to apply water to the clay for lubricating purposes. The application of water may be for polishing purposes only and in this event would be supplied to the tool after the clay had been applied to the mold and jiggered. If desired, however, water may be applied all during the jiggering operation after the molding surface of the mold has been covered with clay.

When circuit 240 is broken by contact 237, the solenoid 241 of a delayed action switch 159 is de-energized. In this form of switch, the contact 242 is adapted to close circuit 243 a short time after solenoid 241 is de-energized and when circuit 243 is energized, push type solenoid 244 is also energized and the plunger 245 thereof is operative to close water valve 158 and thus interrupt the flow of water to the jiggering tool. The delayed action permits the water to remain on during the polishing period. When the pug mill is stopped and pressure on the jiggering tool from above is relaxed, circuit 240 is opened by the immediate withdrawal of contact 237. We have provided a cam operated switch 246 for holding circuit 240 open to thus prevent the opening of water valve 158 until a predetermined time during the next jiggering operation. Switch 246 is actuated by a cam 247, Figure 9, fixed on cam shaft 14. The cam is formed for opening circuit 240 just prior to the lowering of chuck 67 and for holding the circuit open until the succeeding jiggering operation has commenced.

Figure 20:
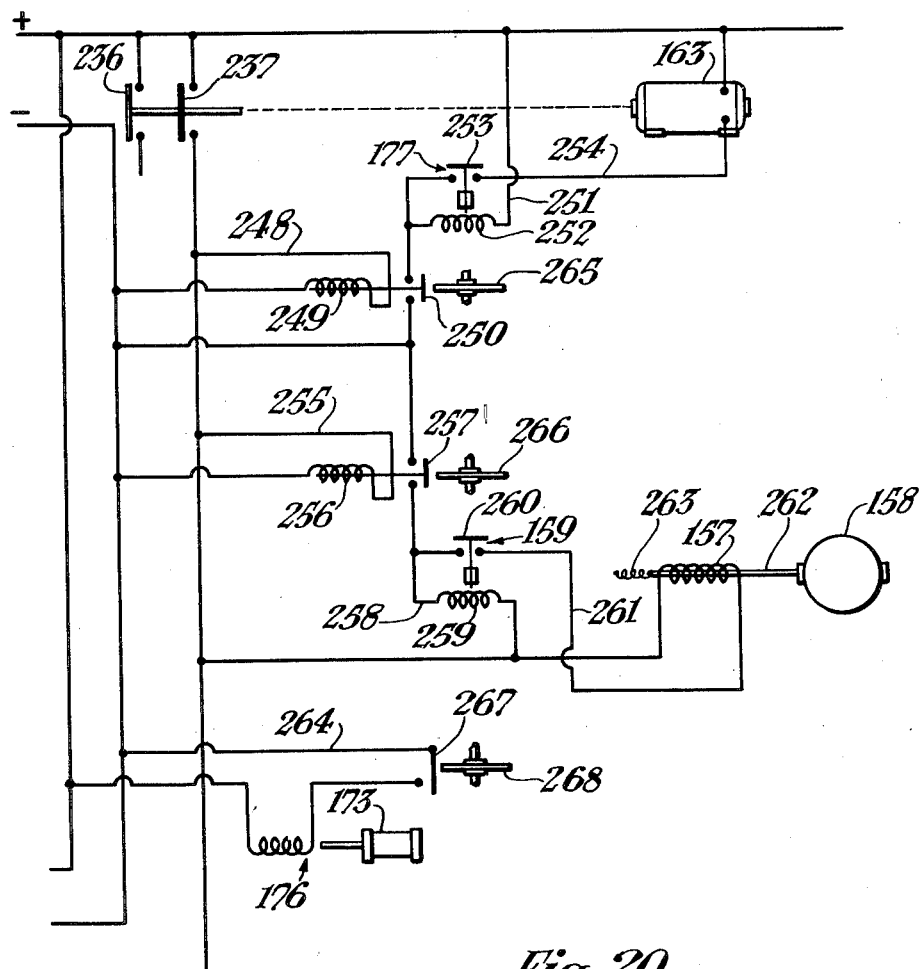
Figure 20 is a wiring diagram showing the electrical-mechanical control system for operating the apparatus of Figure 11.

We have mentioned hereinbefore that the rotation of the jigger tool may be interrupted at the end of the jiggering operation and in Figure 11, have shown certain modifications in the structure to enable this to be done. We have also shown in Figure 20, a wiring diagram covering the various electrical circuits to be employed in connection with the operation of the jigger of Figure 11.

Contact 237 is arranged to close rather than open a circuit when switch 235 is actuated. When contact 237 closes the circuit, circuit 248 is energized and this causes push type solenoid 249 to be energized thereby opening switch 250 and de-energizing circuit 251. This de-energizes solenoid 252 associated with delayed action switch 177. Switch 177 is that type in which the contact 253 is normally held in circuit closing position when solenoid 252 is energized. A short time after the solenoid is de-energized, circuit 254, controlled by switch 177 is opened and motor 163 is de-energized. This delayed action permits the tool to rotate for a short interval after clay pressure is relaxed to polish the ware.

When contact 237 is closed, circuit 255 is also energized and this causes push type solenoid 256 to open switch 257 thereby de-energizing circuit 258 and solenoid 259, associated with delayed action switch 159. Switch 159 is that form of switch wherein the contact 260 is normally held in closed position when circuit 258 is energized. When the circuit is de-energized, switch 159 is opened after a short delay to thereby de-energize circuit 261 and solenoid 157. When solenoid 157 is de-energized, the plunger 262 is pulled back by spring 263 to thereby close water valve 158 and permits the water to remain on during the ware polishing period.

As soon as contact 237 moves to circuit opening position, solenoid 249 is de-energized, however, motor circuit 254 and solenoid circuit 251 will remain open until such time as cam 265 fixed on main cam shaft 14, Figure 3, closes switch 250. Cam 265 is formed for closing switch 250 incident to insertion of the mold in the jiggering chamber and for holding the circuit open during the time the mold is being lowered by chuck 67 onto the mold transfer therebelow and lifting another mold up to the jiggering position. In the case of the water valve 158, circuits 261 and 258 remain open until switch 257 is closed by cam 266 also formed for closing the switch incident to the resumption of jiggering operations and for allowing the switch to remain open during the interval of mold replacement at the jiggering position.

The operation of brake 171' is independently controlled. Circuit 264 is controlled by switch 267 operated by cam 268, fixed on cam shaft 14. The cam is formed for closing switch 267 just prior to the lowering of chuck 67 and for holding the circuit closed until motor 163 is energized. When circuit 264 is energized, push type solenoid 176 operates to apply brake 171'. When the circuit is de-energized, the solenoid plunger may be returned to initial position by a spring.

In making ware with the apparatus hereof, we prefer to employ what is known as a ricket edge mold. This type of mold is formed with a sharp edge spaced inwardly from the brim along the margin of the ware forming surface. With this form of mold it is unnecessary to trim the spare clay from the brim of the ware during jiggering because any excess which flows beyond the sharp edge will be cracked off during subsequent drying of the ware.

We claim:

1. In apparatus for making jiggered dinnerware and the like, mold conveying means for carrying molds to and from a jiggering station, a mold lifter for raising a mold from said conveying means up to a jiggering position, a conduit at said jiggering position leading back to an inlet, a rotatable jigger tool inside said conduit, means for forcing clay into said conduit from above the jigger tool and downwardly thereagainst, the tool acting to detach clay from the main body, apply the same to the mold and jigger the clay thereon and means for rotating said jigger tool.

2. In apparatus for making jiggered dinnerware and the like, intermittently movable mold conveying means for carrying molds to and from a jiggering station, an intermittently movable mold lifter for raising a mold from said conveying means up to a jiggering position, a conduit at the jiggering position, a rotatable jigger tool inside the conduit, and means for forcing clay through the conduit against the jigger tool to be cut off and applied to a mold therebelow thereby.

3. In apparatus for making jiggered dinnerware and the like, mold conveying means for carrying molds to and from a jiggering station, a mold lifter for raising a mold from said conveying means up to a jiggering position, a conduit at the jiggering position leading back to an inlet, a rotatable jigger tool inside said conduit and a pug mill having an outlet in closed communication with the inlet for forcing a column of clay into said conduit and downwardly against the jigger tool.

4. In apparatus for making jiggered dinnerware and the like, mold conveying means for carrying molds to and from a jiggering station, a mold lifter for raising a mold from said conveying means up to a jiggering position, a conduit at the jiggering position leading back to an inlet, a rotatable jigger tool inside said conduit and a pug mill having a de-airing chamber provided with an outlet in closed communication with the inlet for supplying clay to said conduit.

5. In apparatus for making jiggered dinnerware and the like, intermittently movable mold conveying means for carrying molds to and from a jiggering station, an intermittently movable mold lifter for raising a mold from said conveying means up to a jiggering position, a conduit at the jiggering position leading back to an inlet, a rotatable jigger tool inside said conduit and an intermittently operated means connected to the inlet for forcing clay into the conduit.

6. In apparatus for making jiggered dinnerware and the like, intermittently movable mold conveying means for carrying molds to and from a jiggering station, an intermittently movable mold lifter for raising a mold from said conveying means up to a jiggering position, a stationary conduit at the jiggering position leading back to an inlet, a continuously rotatable jigger tool inside said conduit and a pug mill having a de-airing chamber provided with an outlet in closed communication with said inlet for supplying clay to said conduit.

7. In apparatus for making jiggered dinnerware and the like, mold conveying means for carrying molds to and from a jiggering station, a mold lifter for raising a mold from said conveying means up to a jiggering position, a conduit at the jiggering position leading back to an inlet, means connected to said inlet for supplying clay to said conduit and means for jiggering clay under vacuum inside said conduit.

8. In apparatus for making jiggered dinnerware, mold conveying means for carrying molds to and from a jiggering station, a mold lifter for raising a mold from said conveying means up to a jiggering position, a conduit at the jiggering position leading back to an inlet, a de-airing pug mill having a vacuum chamber provided with an outlet connected to said inlet and means for cutting off and jiggering clay under vacuum inside said conduit and for lubricating the clay whilst being jiggered.

9. In apparatus for making dinnerware, mold indexing means for carrying molds from station to station, a mold lifter for lifting a mold up to a jiggering position, a tube disposed with the lower end thereof at the jiggering position, means for moving a pug of clay downwardly inside the tube toward the outlet end thereof, means for cutting off clay from the leading end of said pug and for jiggering clay inside said tube, means for interrupting the operation of the clay moving means at irregular intervals and means for restarting the operation thereof at regular intervals.

10. In apparatus for making dinnerware, mold indexing means for carrying molds from station to station, a mold lifter at one of the stations for lifting molds up to a jiggering position, a tube having an outlet at the jiggering position and an inlet, means for forcing clay into said inlet, means for cutting off and jiggering clay inside said tube and pressure responsive means operable in response to a rise in jiggering pressure for interrupting the operation of said means for forcing clay into said inlet.

11. In the manufacture of potteryware, the method which comprises, indexing molds at regular intervals from station to station, lifting a mold at one of the stations up to a jiggering position, moving a column of clay along a passage downwardly toward the mold at the jiggering position, cutting off and jiggering the clay inside the passage, stopping the movement of the column of clay at irregular intervals and starting the movement of the clay at regular, periodic intervals.

ALBERT J. WAHL.
GEORGE J. CRONINGER.

REFERENCES CITED

The following references are of record in the file of this patent:

UNITED STATES PATENTS

| Number | Name | Date |
|---|---|---|
| Re. 20,401 | Miller | June 8, 1937 |
| 1,769,528 | Miller | July 1, 1930 |
| 1,769,529 | Miller | July 1, 1930 |
| 1,769,530 | Miller | July 1, 1930 |
| 2,046,525 | Miller | July 7, 1936 |
| 2,103,086 | Miller | Dec. 21, 1937 |
| 2,409,172 | Miller | Oct. 8, 1946 |